United States Patent
Griessbach

[11] Patent Number: 6,091,779
[45] Date of Patent: Jul. 18, 2000

[54] PROCESS FOR THE WIRELESS TRANSMITTING OF ENERGY AND DATA

[75] Inventor: Robert Griessbach, Weyarn, Germany

[73] Assignee: Bayerische Motoren Werke Aktiengesellschaft, Munich, Germany

[21] Appl. No.: 08/996,299

[22] Filed: Dec. 22, 1997

[30] Foreign Application Priority Data

Dec. 20, 1996 [DE] Germany .......................... 196 53 522

[51] Int. Cl.⁷ ................. B60L 1/00; B60L 3/00; H02G 3/00; H04B 3/00
[52] U.S. Cl. .......................... 375/258; 307/10.1; 333/177; 455/41; 379/55.1
[58] Field of Search ............................. 375/258; 307/10.1

[56] References Cited

U.S. PATENT DOCUMENTS

| | | | |
|---|---|---|---|
| 4,799,236 | 1/1989 | Janssen ..................................... | 375/258 |
| 5,293,400 | 3/1994 | Monod et al. ............................ | 375/219 |
| 5,418,353 | 5/1995 | Katayama et al. . | |
| 5,515,399 | 5/1996 | Swart ...................................... | 375/258 |
| 5,798,913 | 8/1998 | Tiesinga .................................... | 363/21 |
| 5,821,632 | 10/1998 | Normann et al. ....................... | 307/10.1 |
| 5,856,710 | 1/1999 | Baughman et al. ..................... | 307/10.1 |

FOREIGN PATENT DOCUMENTS

| | | |
|---|---|---|
| 0 482 234 A1 | of 1990 | European Pat. Off. . |
| 0482234A1 | 4/1992 | European Pat. Off. ........ B60R 16/02 |
| 0 616 924 A1 | of 1993 | European Pat. Off. . |
| 27 40 533 C2 | of 1982 | Germany . |
| 32 44 566 A1 | of 1984 | Germany . |
| 39 32 035 A1 | of 1990 | Germany . |
| 38 10 702 C2 | of 1992 | Germany . |
| 43 22 811 A1 | of 1994 | Germany . |
| 43 28 600 A1 | of 1995 | Germany . |
| 4328600A1 | 3/1995 | Germany ....................... G08C 17/00 |
| 195 12 855 A1 | of 1996 | Germany . |
| 196 14 161 A1 | of 1996 | Germany . |
| WO 94/01846 | of 1994 | WIPO . |

*Primary Examiner*—Stephen Chin
*Assistant Examiner*—Paul N Rupert
*Attorney, Agent, or Firm*—Evenson, McKeown, Edwards & Lenahan, P.L.L.C.

[57] ABSTRACT

In the case of a process for the wireless transmission of energy and data between two parts, preferably the steering wheel and the steering column of a vehicle, having a transformer-type transmitter and consisting of a primary and secondary winding assigned to the parts, and a rectangular carrier frequency on the primary side, the data transmission is carried out in one direction by the modulation of the carrier signal and in the other direction outside the switching flanks of the carrier signal.

11 Claims, 2 Drawing Sheets

PROCESS FOR THE WIRELESS TRANSMITTING OF ENERGY AND DATA

BACKGROUND AND SUMMARY OF THE INVENTION

This application claims the priority of German patent document 196 53 522.0, the disclosure of which is expressly incorporated by reference herein.

The invention relates to a process for transmitting energy and data, for example, from the steering column to the steering wheel of a vehicle. Flexible lines are predominantly used nowadays for this purpose. In the case of the steering wheel, a so-called flat spiral spring, however, is used for this purpose. The flat spiral spring has the disadvantage that it causes noises, is mechanically sensitive and, because of its construction, has unfavorable EMV characteristics.

No contact processes on an optical and inductive basis are also known. The optical processes have the disadvantage that they are susceptible to dirt; and higher powers (for example, for a steering wheel heater) cannot be transmitted.

In a process of the initially mentioned type disclosed in International Patent Document WO 94/01846A, a transformer used as the transmitting device is operated by means of a fixed rectangular waveform having a frequency which is modulated as a function of the energy to be transmitted from the primary to the secondary side. For data transmission in both directions, a high-frequency oscillation is inserted at the rising and falling flanks of the switching signal. The transmission from the primary to the secondary side in this case takes place, for example, at the rising flanks; in the other direction, the transmission takes place at the falling flanks.

The disadvantage of this process is that the data transmission rate in both transmitting devices is limited by the switching frequency of the excitation for the transmitter. In addition, the process is critical in that high-frequency interferences always occur at the switching flanks which may disturb data transmission.

An object of the present invention is to provide a process of the initially mentioned type which is secure with respect to interferences.

This and other objects and advantages are achieved by the process according to the invention, in which the transmission of power takes place by controlling the primary side of the transmitter by a direct-current-free alternating signal. The alternating signal itself is also the carrier of the information from the primary to the secondary side. The coding of the signal transmitted in this direction can be performed by pulse width, amplitude or phase modulation of the alternating signal, preferably by means of a biphase code mode. This code is also free of direct current and is therefore suitable for use as the control signal for the transmitter. The data rate in the given direction is therefore identical to the control frequency of the transmitter.

Data transmission in the reverse direction—in the selected example, from the secondary to the primary side—can be performed by modulating a high-frequency signal (HF-burst), at a frequency of for example two MHz, upon defined points of the primary signal. These points are situated outside the switching flanks of the primary signal, so that no data are transmitted in the area of the switching flanks of the primary side. This ensures that disturbances of the data traffic caused by the switching flanks are not erroneously interpreted as an information signal.

If the transmission in the reverse direction takes place at a frequency which is an even number multiple of the transmission frequency in the first-mentioned direction, the transmission frequency can also be increased in the reverse direction, and a larger quantity of data can be transmitted in this direction. Such an approach is suitable for use in the vehicle steering wheel/steering column example, in which the reverse direction involves the transmission of information which is to be given in the steering wheel and transmitted to the steering column. As a result it is possible to arrange (for example, in the steering wheel) a plurality of switches whose switching condition is easily and accurately transmitted and is converted into a corresponding wiring of the pertaining apparatuses.

Other objects, advantages and novel features of the present invention will become apparent from the following detailed description of the invention when considered in conjunction with the accompanying drawings.

DETAILED DESCRIPTION OF THE DRAWINGS

Figure 2:
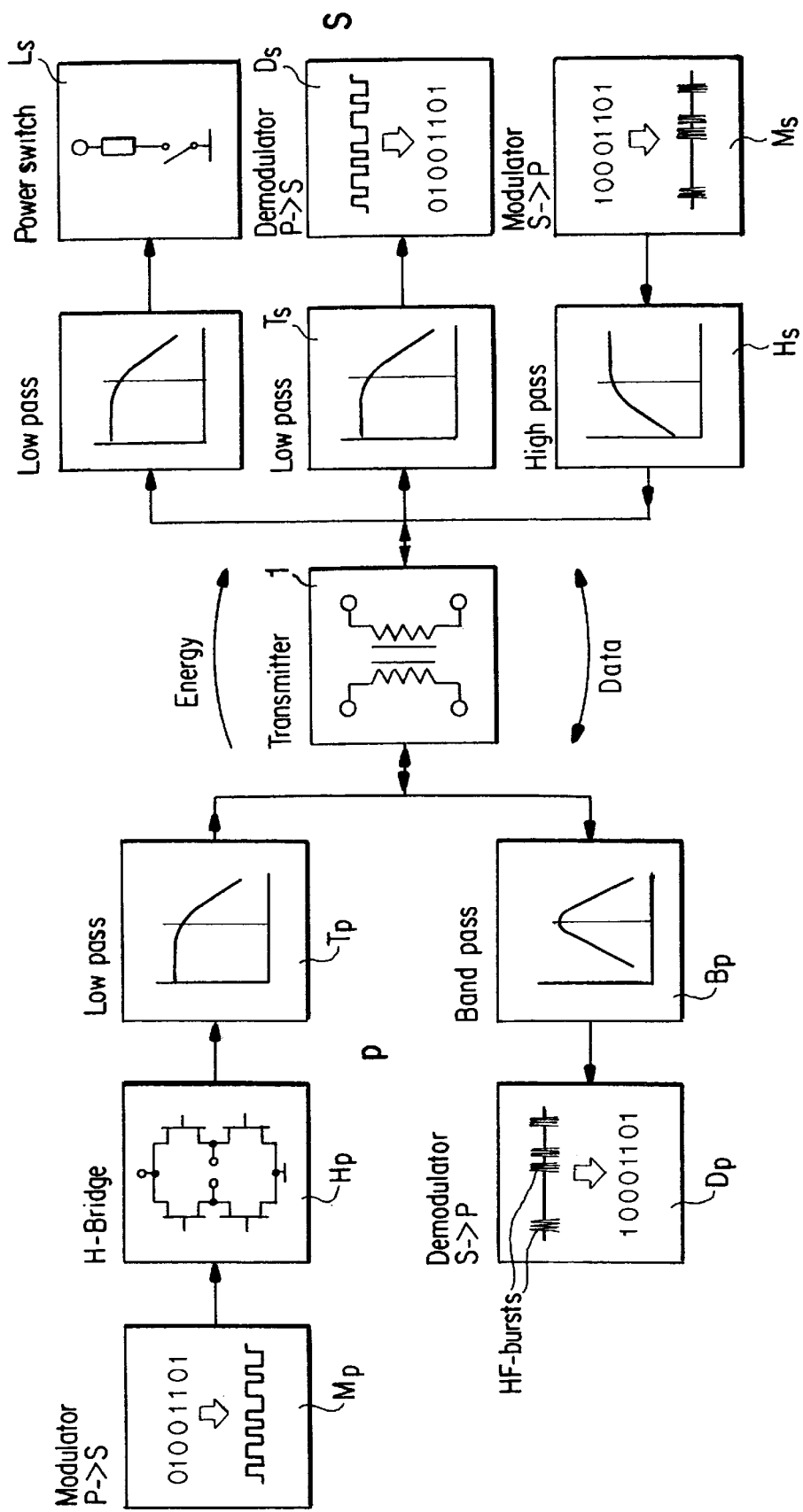
FIG. 2 is a block diagram for implementing the data traffic illustrated in FIG. 1.

Referring to FIG. 2, data and energy transmission are performed by way of a transformer 1 which acts as a transmitter. Both data and energy are transmitted from a primary side P to a secondary side S of the transformer. Only data, however, are transmitted in the opposite or reverse direction from S to P (from the secondary side to the primary side).

Figure 1:
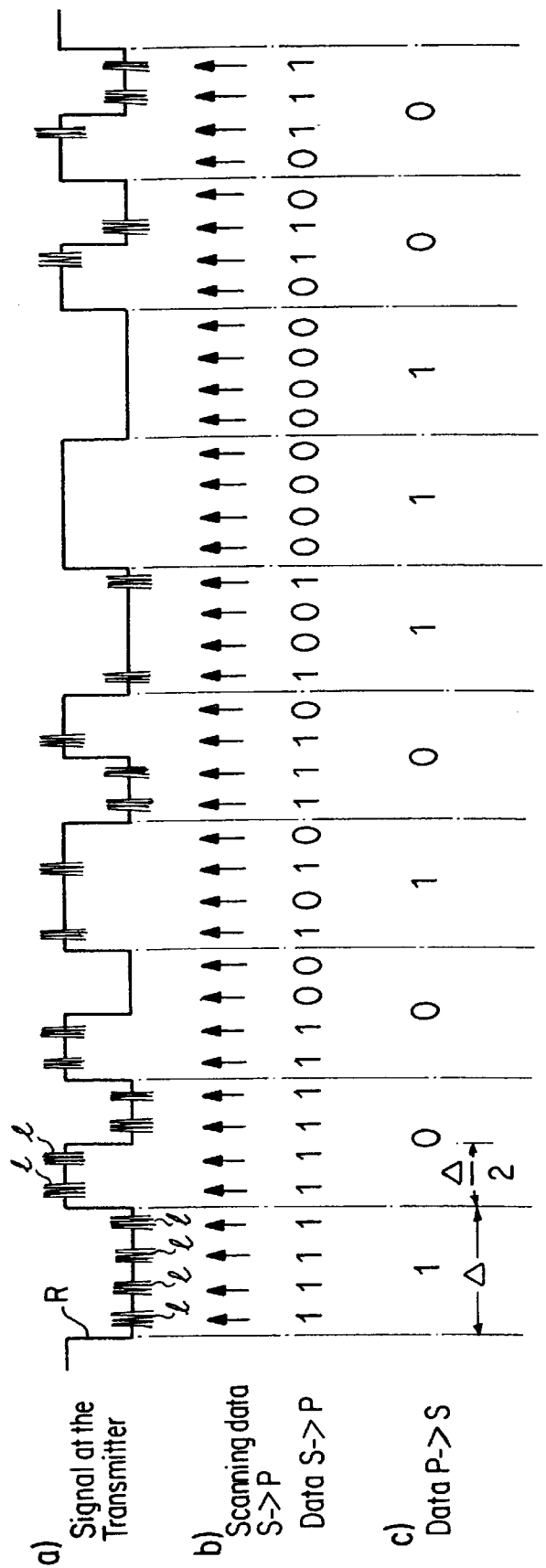
FIG. 1 is a wave diagram for explaining the data traffic between parts which can be moved relative to one another.

According to the invention, a signal whose course is illustrated in diagram a of FIG. 1 is generated at the transmitter. Energy is transmitted by means of a timed rectangular signal R which is modulated in the biphase code mode, whereby data are transmitted from P to S. These data are indicated, for example, in diagram c of FIG. 1, and result in the course illustrated in diagram a. Within the period Δ for the transmission of a bit, datum "1" does not result in a change of Signal R, while information "0" results in a change at the point in time Δ/2. After each period, the rectangular signal changes its preceding sign.

A higher-frequency signal for data transmission in the opposite direction (that is, from S to P) is superimposed on the biphase code signal R modulated in this manner, corresponding to the content of the data transmitted from P to S. The modulation frequency for data transmission from S to P is an even number multiple of the frequency for the data transmission from P to S. Moreover, the data are transmitted from S to P in portions of the rectangular signal R which are outside the switching flanks thereof.

In the illustrated example, the data transmission rate from S to P is four times as large as the transmission rate from P to S. The data 1 are transmitted by modulation of the rectangular signal with a high frequency of, for example, 2 MHz, that is, in the form of so-called HF-bursts. The presence of the illustrated bursts b corresponds to a binary 1, while a binary 0 can be recognized by the absence of an HF-burst given to the transmitter. The data transmitted in this manner from S to P are shown as examples in diagram b of FIG. 1. In this case, the upwardly directed small arrows point to the respective sites of the signal existing at the transmitter 1 at which the HF-bursts are located which are assigned to the data transmitted from S to P.

The block diagram illustrated in FIG. 2, on the primary side, shows a modulator $M_p$ for transmitting the data from P to S which generates a pulse sequence i modulated corresponding to the information transmitted from P to S, in the manner described previously. By way of an H-bridge $H_p$ and a low pass filter $T_p$, the dual-phase code signal illustrated in FIG. 1, diagram a, is generated, and delivered to the primary side of the transmitter 1.

A demodulator $D_p$ is also connected to the primary side of the transmitter by way of a band pass filter $B_p$. Thus, the information existing on the transmitter and given on the secondary side (diagram b of FIG. 1) is analyzed.

On the secondary side, connected to the secondary winding of the transmitter 1, electric consuming devices (not shown) can be switched by a symbolically illustrated power switch $L_s$. In the case of a steering wheel, this is a steering wheel heater or a handsfree device of a telephone arranged in the steering wheel. As a result, the energy transmitted by the transmitter is distributed on the secondary side to the consuming devices.

A demodulator $D_s$ is connected to an output of the transmitter 1 by way of a low pass filter $T_s$, and information transmitted in the control signal of the transmitter is analyzed. This information is identical with the information existing at the modulator $M_p$, thus achieving the information exchange between the primary and the secondary side.

Finally, a modulator $M_s$ is connected on the secondary side by way of a high pass filter $H_s$. Thus, information fed on the secondary side in the form of the HF bursts is modulated upon the signal of the transmitter 1 present on the secondary side. This signal is identical with the signal received at the demodulator $D_p$, thus achieving data transmission from the secondary to the primary side. (The synchronization of modulator $M_p$ and $M_s$ is performed in a conventional manner, and is not shown.)

By means of the process according to the invention, the information transmitted from the secondary to the primary side, outside the switching flanks of the primary-side biphase code signal, is placed on this signal. As a result, disturbances which would occur at the switching flanks of the code signal are avoided, and undisturbed data traffic is achieved between the secondary and the primary side.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for wireless transmission of energy and data between two parts using a transmitter comprising a transformer which has a primary winding assigned to one part on a primary side and a secondary winding assigned to the other part on a secondary side, via a rectangular carrier signal having flanks defined by switching edges of said rectangular carrier signal, which is generated on the primary side, said process comprising:

transmitting data from the primary to the secondary side at a first data transmission rate, by at least one of amplitude and phase modulation of the carrier signal; and transmitting data from the secondary to the primary side at a second data transmission rate by selectively modulating high frequency bursts onto said rectangular carrier signal as a function of transmitted data, at points outside switching flanks of the carrier signal.

2. The process according to claim 1 wherein data transmission in one direction is carried out by modulation at a higher frequency than data transmission in an opposite direction.

3. The process according to claim 2 wherein said second data transmission rate is an even-number multiple of said first data transmission rate.

4. The process according to claim 1 wherein data transmission from the primary to the secondary side is performed in a biphase code mode.

5. The process according to claim 2 wherein data transmission from the primary to the secondary side is performed in a biphase code mode.

6. The process according to claim 3 wherein data transmission from the primary to the secondary side is performed in a biphase code mode.

7. The process according to claim 1 wherein data transmission from the secondary to the primary side is performed by encoding HF-bursts.

8. The process according to claim 1 wherein said second data transmission rate is an even number multiple of said first data transmission rate.

9. A method for transmitting energy and data via an inductive coupling, comprising:

applying a square wave carrier signal to a primary side of said inductive coupling, whereby energy is transmitted to a secondary side of said inductive coupling, said square wave carrier signal having flanks defined by switching edges of said square wave carrier signal;

modulating said square wave carrier signal at said primary side by means of one of amplitude modulation, frequency modulation and phase modulation, according to data to be transmitted from said primary side to said secondary side, at a first data transmission rate;

modulating said square wave carrier signal at said secondary side by selectively superimposing high frequency bursts onto said square wave carrier signal according to data to be transmitted from said secondary side to said primary side, at points on said square wave carrier signal which are separated in time from switching flanks of said square wave carrier signal.

10. A method for transmitting energy and data via an inductive coupling according to claim 9, wherein said data transmission from the primary side to the secondary side is performed in a biphase code mode; and said points at which said HF-bursts are superimposed on said square wave carrier occur at a second data transmission rate which is an even number multiple of aid first data transmission rate.

11. A method for transmitting energy and data via an inductive coupling according to claim 1, wherein data are transmitted from said secondary side to said primary side by modulating said rectangular carrier signal at said secondary side by selectively superimposing HF-bursts on said rectangular carrier signal according to data to be transmitted from said secondary side to said primary side, at points on said rectangular carrier signal which are separated in time from switching flanks of said rectangular carrier signal.

* * * * *